Patented May 16, 1939

2,158,899

UNITED STATES PATENT OFFICE 2,158,899

DISPERSIBLE SULPHUR AND METHOD OF MAKING THE SAME

Roy M. Gideon, Palmyra, N. J., assignor to MacAndrews and Forbes Company, Camden, N. J., a corporation of New Jersey No Drawing. Application July 21, 1937, Serial No. 154,935

9 Claims. (Cl. 252—6)

This invention relates to a new and useful sulphur composition, and more particularly to a sulphur composition which is readily wettable in water.

Sulphur compositions of the character set forth are widely used as fungicides in agricultural spray solutions, and also for other purposes, such as the compounding of sulphur with rubber latex where the same is to be subjected to a vulcanization process.

Elemental sulphur in the usual yellow or octahedral form is a typical hydrophobic solid, not readily wetted by water, and in order to disperse finely ground sulphur of this form in aqueous solutions, it is necessary to modify its surface characteristics by the use of a suitable wetting agent. As a rule, the wetting agents employed are colloidal substances which are readily adsorbed on the surfaces of the sulphur particles with which they come in contact so that said surfaces of the sulphur particles are rendered hydrophilic and can be readily wetted by and suspended in aqueous solutions. Numerous wetting agents for sulphur such as casein, saponin, bentonite, and the like have been widely used commercially with varying degrees of success, but in general such wetting agents are quite expensive, and are not fully satisfactory in actual practice.

With the foregoing observations in mind, the principal object of the present invention is to provide a sulphur composition which is readily "wettable" and which is held in stabilized suspension when dispersed in water or aqueous solution.

Another object of the invention is to provide a readily "wettable" sulphur composition of the stated character which is held in stabilized suspension when dispersed in an aqueous solution containing fungicidal substances such as arsenate of lead, nicotine sulphate and the like.

A further object of the invention is to provide a readily "wettable" sulphur composition of the character described which is uniformly satisfactory and comparatively inexpensive to manufacture.

These and other objects of the invention as well as the features and details of its production and composition are set forth hereinafter.

The present invention contemplates the use of an alkaline secondary licorice extract obtained by the digestion of spent licorice root with caustic alkali, as a wetting agent for sulphur. Such secondary licorice extract is particularly effective for such purpose, and the resulting composition is uniformly satisfactory in all respects. Secondary extract of licorice is a soda extract of licorice root from which the water-soluble ingredients have been previously removed, and is quite unlike the so-called primary extract of licorice in its method of preparation and chemical characteristics, the former being weakly alkaline in reaction and consisting of the sodium salt of the water-insoluble resinous ingredients of the licorice root, whereas the latter is acid in reaction and contains large amounts of sugars, starches, glycyrrhizin and other materials.

The invention consists essentially of a mixture of an alkaline secondary extract of licorice obtained by the digestion of spent licorice root with caustic alkali and sulphur in suitable proportions. Such secondary licorice extract may be produced by any suitable method, such as that described in Letters Patent No. 1,161,090, issued November 23, 1915, where the process is carried out by taking spent licorice root from which licorice juices (the primary extract) have been extracted, and subjecting this spent root to a secondary extracting method or process in a digester together with caustic soda solution. For example, 12 tons of wet spent root (about 70% moisture) and 2000 gallons of 10° Baumé caustic soda solution are placed in the digester, and the mixture of the spent root and caustic soda solution are subjected to a high temperature so that boiling thereof occurs at approximately 120 pounds pressure per square inch. Boiling at this pressure is allowed to continue for approximately ten hours after which the extracted matter dissolved from the root is separated from the residue. It may then be evaporated to the desired consistency, either to a dry powder or to a concentrated liquor, for example a solution of approximately 18° Baumé at 120° F.

The sulphur employed may be any of the several commercial forms of fine sulphur, and for example, generally satisfactory results are obtained by the use of flowers of sulphur, ground sulphur (300 mesh), precipitated sulphur (such as that recovered as a by-product in the manufacture of illuminating gas) and the like.

The composition may be prepared in several ways. For example, suitable proportions of secondary licorice extract prepared in the manner above described may be added to the water or aqueous solution with which the sulphur is to be mixed, after which the sulphur may be stirred or otherwise mixed into the resulting solution, or suitable proportions of such secondary licorice extract in dry powdered form and sulphur may be mixed together to produce a readily "wettable"

dry mixture easily dispersible in water or an aqueous solution when added thereto. It has been found, however, that a superior "wettable" sulphur composition is obtained when the sulphur and secondary licorice extract are mixed together in the presence of a minimum quantity of water to produce a thick plastic mass which is then dried and ground into desired form and fineness.

The percentage of secondary licorice extract on a dry basis with relation to the sulphur to be treated or mixed therewith is not critical and may vary considerably. It generally exceeds 3% (dry basis) and preferably approaches a percentage of 10% (dry basis) since such higher percentages of secondary extract of licorice afford superior stability and dispersion of the sulphur when in aqueous solution. Larger proportions may be used if desired, but since satisfactory results are obtained within the percentages stated, a large excess is not recommended from the standpoint of economy.

In a typical example, 450 pounds of sulphur ground to a fineness of 300 mesh are mixed with 139 pounds of secondary licorice extract having a density of 18° Baumé at 120° F. and containing 50 pounds dry solids. An intimate mixture is obtained in a suitable mixing device provided with a steam jacket. The mixing is carried out at room temperature until a uniform semi-plastic mass is obtained. Low pressure steam is then admitted to the jacket of the mixer, and the agitation is continued until substantially all the moisture is removed from the product. The dry, granular material thus produced is then ground into a powder of the desired fineness.

The sulphur composition contemplated by the present invention and made in accordance with the method or process herein disclosed is uniformly satisfactory and embodies maximum "wetting" properties to the end that it is held in stabilized condition when dispersed in water or aqueous solution. Other materials may be present in the aqueous dispersion of sulphur when desired, for example, in the preparation of a fungicide, such substances as arsenate of lead, nicotine sulphate, etc., may be added. The invention, of course, is not limited to the particular method of manufacture, or to the proportions of ingredients set forth, but these may be varied widely without departing from the invention.

I claim:

1. The process of rendering sulphur dispersible in aqueous solution which comprises associating finely divided sulphur with an alkaline secondary licorice extract obtained by the digestion of spent licorice root with caustic alkali.

2. The method of producing a wettable sulphur product which comprises mixing together finely divided sulphur and an alkaline secondary licorice extract obtained by the digestion of spent licorice root with caustic alkali.

3. The method of producing a wettable sulphur product which comprises mixing together finely divided sulphur and an alkaline secondary licorice extract obtained by the digestion of spent licorice root with caustic alkali, the percentage of said extract being approximately 3% to 10% of the weight of the sulphur on a dry basis.

4. The method of producing a wettable sulphur product which comprises mixing finely divided sulphur and an alkaline secondary licorice extract obtained by the digestion of spent licorice root with caustic alkali in the presence of sufficient water to form a thick plastic mass, and then heating said plastic mass until substantially all of the moisture has been removed therefrom.

5. The method of producing a wettable sulphur product which comprises mixing finely divided sulphur and an alkaline secondary licorice extract obtained by the digestion of spent licorice root with caustic alkali in the presence of a minimum amount of water to form a thick, plastic mass at approximately room temperature, and then heating said plastic mass while continuously agitating it until substantially all of the moisture has been removed therefrom to produce a dry granular material.

6. The method of producing a wettable sulphur product which comprises mixing finely divided sulphur and an alkaline secondary licorice extract obtained by the digestion of spent licorice root with caustic alkali in the presence of a minimum amount of water to form a thick, plastic mass at approximately room temperature, the percentage of said extract being approximately 3% to 10% of the weight of the sulphur on a dry basis, then heating said plastic mass while continuously agitating it until substantially all of the moisture has been removed therefrom to produce a dry granular material, and thereafter grinding said mass to predetermined fineness.

7. Finely divided sulphur rendered dispersible in aqueous solution by an alkaline secondary licorice extract obtained by the digestion of spent licorice root with caustic alkali.

8. A dry, wettable sulphur product comprising a dry, finely divided mixture of finely divided sulphur and an alkaline secondary licorice extract obtained by the digestion of spent licorice root with caustic alkali.

9. A dry, wettable sulphur product comprising a dry, finely divided mixture of finely divided sulphur and an alkaline secondary licorice extract, the percentage of said extract obtained by the digestion of spent licorice root with caustic alkali being approximately 3% to 10% of the weight of the sulphur on a dry basis.

ROY M. GIDEON.